US012694112B2

(12) United States Patent
Kandiraju et al.

(10) Patent No.: US 12,694,112 B2
(45) Date of Patent: Jul. 28, 2026

(54) DETECTING CLEAN BACKUPS AND SNAPSHOTS FOR SUBSEQUENT DATA RECOVERY OPERATIONS

(71) Applicant: International Business Machines Corporation, Armonk, NY (US)

(72) Inventors: Gokul Bhargava Kandiraju, Briarcliff Manor, NY (US); M Corneliu Constantinescu, San Jose, CA (US); Leo Shyh-Wei Luan, Saratoga, CA (US); Ramanjaneya Sarma Burugula, Yorktown Heights, NY (US); Sangeetha Seshadri, Plano, TX (US); Shafiqul Abedin, San Jose, CA (US); Wayne C. Hineman, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 49 days.

(21) Appl. No.: 18/773,803

(22) Filed: Jul. 16, 2024

(65) Prior Publication Data

US 2026/0023853 A1     Jan. 22, 2026

(51) Int. Cl.
G06F 21/56          (2013.01)
G06F 11/1446          (2026.01)

(52) U.S. Cl.
CPC ........ G06F 21/568 (2013.01); G06F 11/1464 (2013.01); *G06F 2201/84* (2013.01); *G06F 2221/2101* (2013.01)

(58) Field of Classification Search
CPC ............................ G06F 21/568; G06F 11/1464
See application file for complete search history.

(56) References Cited

U.S. PATENT DOCUMENTS

| | | | |
|---|---|---|---|
| 7,877,360 | B2 | 1/2011 | Rohit et al. |
| 8,255,998 | B2 | 8/2012 | Claudatos et al. |
| 8,495,037 | B1 | 7/2013 | Westenberg et al. |
| 10,438,000 | B1 | 10/2019 | Gu et al. |

(Continued)

OTHER PUBLICATIONS

Anonymous, "AI Cyber Event Application Disaster Recovery Using Clean Data Confidence Percentages", IPCOM000271736D, IP.com, Feb. 6, 2023, 7pages.

(Continued)

*Primary Examiner* — Pramila Parthasarathy
(74) *Attorney, Agent, or Firm* — CHIP LAW GROUP

(57)          ABSTRACT

Mechanisms are provided for identifying clean backups of a monitored computing system. A backup of a state of a computing system is generated. In response, these operations are performed: alert data associated with the monitored computing system is retrieved, where alert data is stored in response to patterns of data accesses indicating a possible cyber-attack on the computing system; a classification engine executes a classification operation on the alert data to determine if it indicates that the state of the monitored computing system was the target of a cyber-attack within a predetermined period of time prior to a time the backup was generated; if so, a first tag is generated for the backup indicating the backup to be corrupted; if not, a second tag for the backup is generated indicating the backup to be clean; and the first or second tag is stored in association with the backup.

18 Claims, 6 Drawing Sheets

(56) References Cited

U.S. PATENT DOCUMENTS

| | | | |
|---|---|---|---|
| 10,650,146 B1 | 5/2020 | Gaurav et al. | |
| 11,847,214 B2 | 12/2023 | Dichiu et al. | |
| 12,393,689 B2 * | 8/2025 | Gee | G06F 21/56 |
| 2019/0236274 A1 * | 8/2019 | Brenner | G06F 21/6245 |
| 2020/0015964 A1 | 1/2020 | Noe et al. | |
| 2021/0319103 A1 | 10/2021 | Constantinescu et al. | |
| 2023/0315855 A1 | 10/2023 | Strogov et al. | |
| 2025/0103438 A1 * | 3/2025 | Gildein | G06F 11/1461 |

OTHER PUBLICATIONS

Burnap, Pete et al., "Malware Classification Using Self Organising
Feature Maps and Machine Activity Data", Science Direct, Com-
puters & Security 73 (2018): 399-410, Dec. 5, 2017, 12 Pages.
Kandiraju, Gokul Bhargava et al., "Defender v.20 Data Resiliency
Service", Internal Power Point Presentation to Potential Customers,
Aug. 2, 2023, 52 pages.

* cited by examiner

100

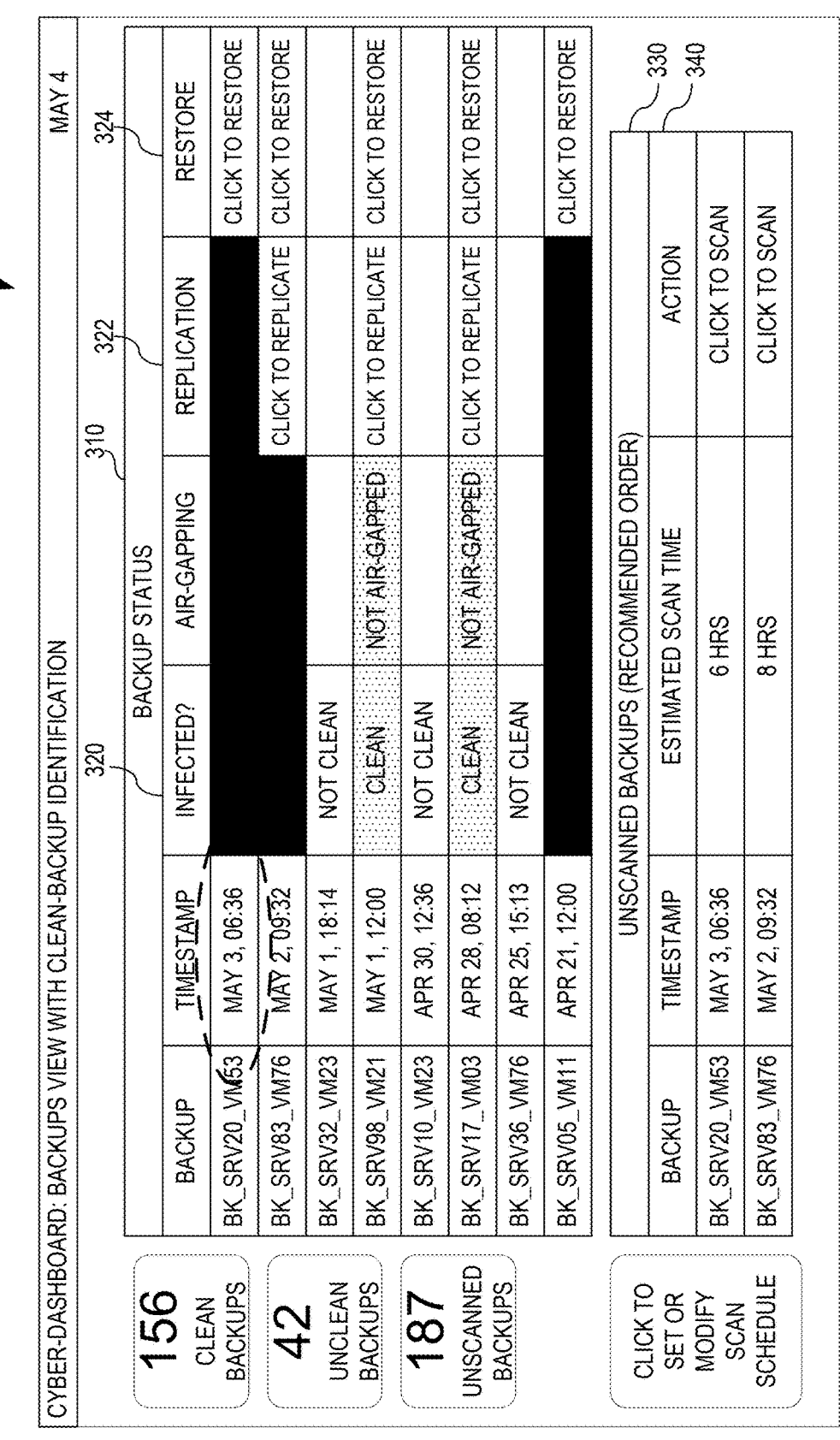

300

CYBER-DASHBOARD: BACKUPS VIEW WITH CLEAN-BACKUP IDENTIFICATION                                                                                              MAY 4

|  | | BACKUP STATUS | | | |
| --- | --- | --- | --- | --- | --- |
| | | 320 | 310 | 322 | 324 |
| BACKUP | TIMESTAMP | INFECTED? | AIR-GAPPING | REPLICATION | RESTORE |
| BK_SRV20_VM53 | MAY 3, 06:36 | | | | CLICK TO RESTORE |
| BK_SRV83_VM76 | MAY 2, 09:32 | | | CLICK TO REPLICATE | CLICK TO RESTORE |
| BK_SRV32_VM23 | MAY 1, 18:14 | NOT CLEAN | | | CLICK TO RESTORE |
| BK_SRV98_VM21 | MAY 1, 12:00 | CLEAN | NOT AIR-GAPPED | CLICK TO REPLICATE | CLICK TO RESTORE |
| BK_SRV10_VM23 | APR 30, 12:36 | NOT CLEAN | | | CLICK TO RESTORE |
| BK_SRV17_VM03 | APR 28, 08:12 | CLEAN | NOT AIR-GAPPED | CLICK TO REPLICATE | CLICK TO RESTORE |
| BK_SRV36_VM76 | APR 25, 15:13 | NOT CLEAN | | | CLICK TO RESTORE |
| BK_SRV05_VM11 | APR 21, 12:00 | | | | CLICK TO RESTORE |

156 CLEAN BACKUPS

42 UNCLEAN BACKUPS

187 UNSCANNED BACKUPS

UNSCANNED BACKUPS (RECOMMENDED ORDER)

| | | 330 | |
| --- | --- | --- | --- |
| | | 340 | |
| BACKUP | TIMESTAMP | ESTIMATED SCAN TIME | ACTION |
| BK_SRV20_VM53 | MAY 3, 06:36 | 6 HRS | CLICK TO SCAN |
| BK_SRV83_VM76 | MAY 2, 09:32 | 8 HRS | CLICK TO SCAN |

CLICK TO SET OR MODIFY SCAN SCHEDULE

MONITOR FILE ACCESS ACTIVITY
502

GENERATE AN AUDIT LOG BASED ON THE FILE ACCESS ACTIVITY
504

COLLECT SAMPLES OF FILE USAGE ACTIVITY
506

RUN A PATTERN RECOGNITION ALGORITHM ON THE SAMPLES OF THE FILE USAGE ACTIVITY FOR DETECTING MALWARE ACTIVITY
508

IN RESPONSE TO DETECTING MALWARE ACTIVITY, RESTORE AT LEAST ONE FILE BASED ON THE AUDIT LOG
510

DETECTING CLEAN BACKUPS AND SNAPSHOTS FOR SUBSEQUENT DATA RECOVERY OPERATIONS

BACKGROUND

The present application relates generally to an improved data processing apparatus and method and more specifically to an improved computing tool and improved computing tool operations/functionality for detecting clean backups and snapshots for subsequent data recovery operations.

Cyber-attacks, e.g., ransomware attacks, are becoming increasingly common, and it is important for organizations to be well prepared to face these threats. It is not a matter of if, but a matter of when an organization is going to be the target of such an attack. Organizations need to put in place methods to detect such attacks, preferably before they occur. However, organizations also need restoration capabilities that can restore the applications, infrastructure, and associated data as quickly as possible for operational continuity. Such restoration methods need to have a clear understanding of data that is corrupted and data that is not corrupted, i.e., "clean."

Organizations typically backup their data on a periodic, and predefined, basis. As an example, one schedule may generate backups hourly or every few hours, daily backups for the last week, and weekly for the last month. Multiple different periods of backup generation may be implemented at the same time. The backup is essentially a snapshot in time of the state of the computing system's applications, infrastructure, and associated data. These backups are needed for restoration operations should the computing system's application state, infrastructure, or associated data becomes corrupted, i.e., restoring the system to a most recent "clean" state.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method in a data processing system is provided for identifying clean backups of a monitored computing system. The method comprises generating a backup of a state of the monitored computing system. The method further comprises, in response to generating the backup: accessing a data storage to retrieve stored logged alert data associated with the monitored computing system, where logged alert data is stored in response to patterns of data accesses of the monitored computing system indicating a possible cyber-attack on the monitored computing system; executing, by a classification engine, a classification operation on the logged alert data to determine whether the logged alert data of the data storage indicates that the state of the monitored computing system was the target of a cyber-attack within a predetermined period of time prior to a time the backup was generated; in response to the classification operation indicating that the monitored computing system was the target of the cyber-attack, generating a first tag for the backup indicating the backup to be corrupted; in response to the classification operation indicating that the monitored computing system was not the target of the cyber-attack, generating a second tag for the backup indicating the backup to be clean; and storing one of the first tag or second tag in association with the backup to thereby indicate the backup to be either corrupted or clean.

In other illustrative embodiments, a computer program product comprising a computer useable or readable medium having a computer readable program is provided. The computer readable program, when executed on a computing device, causes the computing device to perform various operations outlined above with regard to the method illustrative embodiment and combinations thereof.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various operations outlined above with regard to the method illustrative embodiment and combinations thereof.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 3 is an example diagram of a graphical user interface for informing authorized personnel of the "clean" or "corrupted" status of backups and providing graphical user interface elements for initiating a restoration of a computing system state based on a "clean" backup in accordance with one illustrative embodiment;

DETAILED DESCRIPTION

Figure 1:
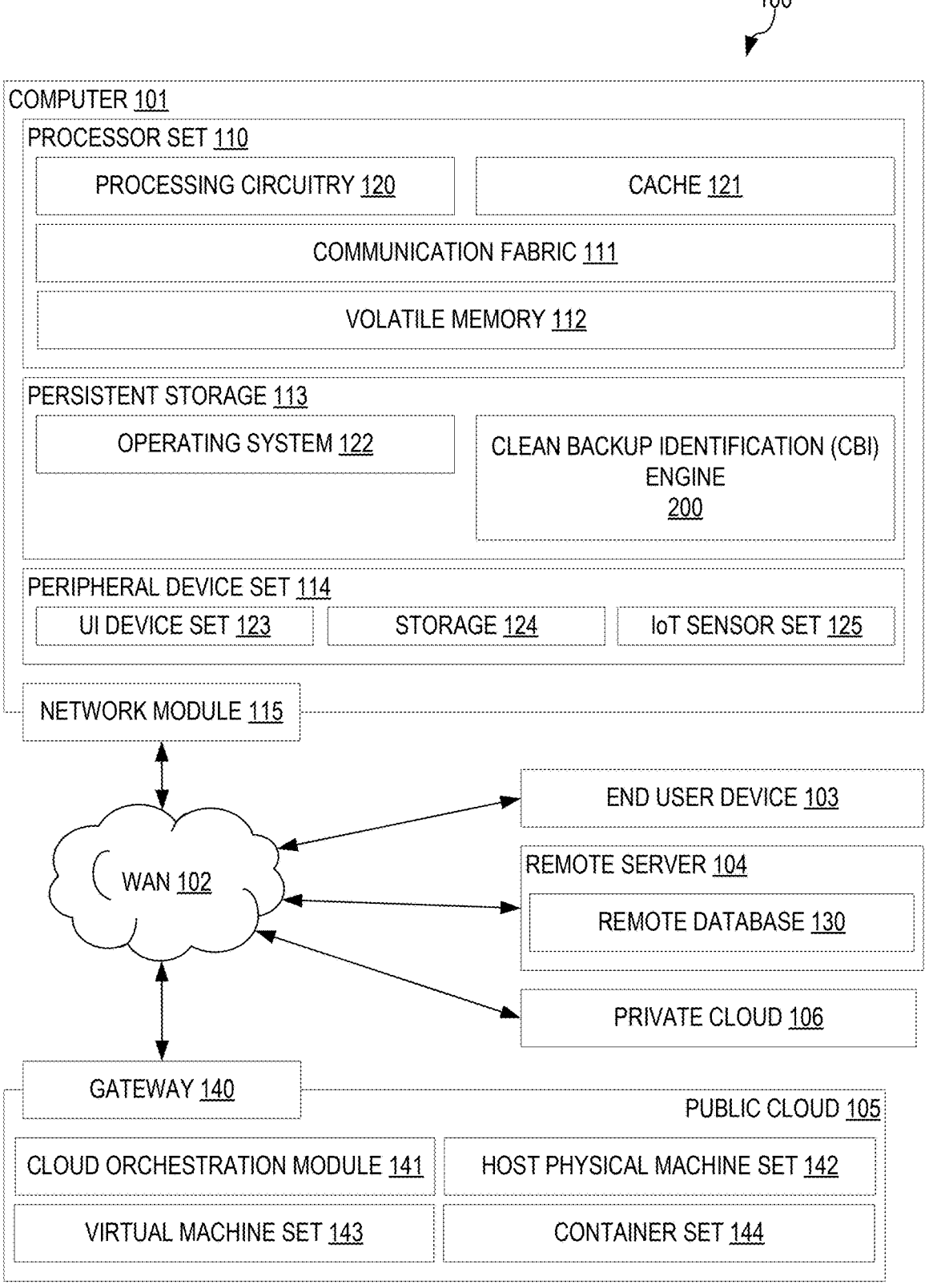
FIG. 1 is an example diagram of a distributed data processing system environment in which aspects of the illustrative embodiments may be implemented and at least some of the computer code involved in performing the inventive methods may be executed.

The illustrative embodiments provide an improved computing tool and improved computing tool operations/functionality for detecting clean backups and snapshots for subsequent data recovery operations. The illustrative embodiments are specifically directed to the computer technology specific problems associated with determining which backups comprise clean data for purposes of recovery of computing system resources, e.g., applications, infrastructure, and/or associated data structures, in the event of an attack or other threat that requires recovery from a backed up state or snapshot of the computing system. Thus, the illustrative embodiments are specifically directed to solving problems in, and arising from, the computer arts and provides a specific improved computing tool and improved computing tool operations/functionality for solving those problems.

As noted above, cyber-attacks, such as ransomware attacks, denial of service attacks, and the like, are greatly increasing and represent a significant cost to any organization that relies on their computing infrastructure and data to function. A cyber-attack can infiltrate a computing system at any point in time and can go undetected for quite a while. During this time period, the computing system and administrator personnel may not be aware of the cyber-attack and may still be going about a normal course of operations, including generating and storing backups and snapshots of the computing system. As a result, it is possible that some of the backups/snapshots could already be infected by the time the cyber-attack is detected and restoration procedures are initiated. Yet, it is imperative that the restoration procedures use "clean" backups/snapshots to restore the computing system, otherwise the cyber-attack may continue and/or proliferate as the restored system may still operate on corrupted data.

Therefore, a mechanism that can identify backups as "clean," i.e., not corrupted by a cyber-attack, is necessary to ensure that an infected version of the system, e.g., an operating system, application, data structures, or any part of the infrastructure, is not restored. Prior methods to identify backups as clean involve scanning of the backups after the backups are generated. Software program(s) typically scan a backup in its entirety looking for signatures, patterns or other fingerprints that might indicate the presence of known cyber-attacks, e.g., ransomware/malware. However, such scanning requires heavy utilization of compute and I/O resources, as all the backup data needs to be read into the memory and processed against the known signatures for a large number of potential cyber-attacks. In addition, scanning takes a large amount of time, e.g., many hours, to determine if a backup is clean. This causes backups that are deemed as "clean" and suitable for restoration operations to be the relatively older (earlier in time) backups. The use of relatively older backups to perform restoration of a computing system will lead to data loss in the case of a cyber-attack occurring before another clean backup can be generated, i.e., changes to the data occurring after the last clean backup will be lost if a restoration is required using the older "clean" backup.

In other words, in some cases, a backup may be generated and not yet scanned for malware/cyber threat signatures to ensure that the backup is a "clean" backup. During the time period between generating the backup and completion of the scanning of the backup to ensure that it is a "clean" backup, a cyber-attack may be detected that requires a restoration from a "clean" backup. As a result, even though the backup may be a more recent backup, it cannot be relied upon as it has not yet been verified to be a "clean" backup. As a result, older backups, which have already been verified as being "clean," may need to be used to perform the restoration operations, which may result in a loss of data as there may have been many changes between the most recent backup and the older backup.

The illustrative embodiments address these problems with existing backup mechanisms by providing an improved computing tool and improved computing tool operations/functionality that facilitates the identification of more recent backups as "clean" backups, such that the amount of data loss is minimized or eliminated in the case of a cyber-attack, and such that the identification of "clean" backups can be performed more quickly than the prior scanning based approaches. The illustrative embodiments determine "clean" backups without having to perform a scanning of the entire backup after the backup is generated, instead relying on near-real time analytics executed on the monitored system on a periodic basis to identify access patterns that are indicative of a potential cyber-attack. This allows the illustrative embodiments to perform analytics on the data accesses at substantially the time the data is being generated and accessed. This also allows for the generation of alerts that can then be used when a backup is generated to tag/label the backups occurring thereafter as "clean" or "not clean."

That is, the alerts and number and characteristics of the alerts may be logged between backup operations. Thus, between backups, the monitored system executes the light weight near real-time analytics on a periodic basis to analyze access patterns and evaluate whether those access patterns trigger an alert. The alerts are sent to a clean backup identification engine which maintains the alerts until a next backup operation occurs. At a later time, when the backup operation is to be performed, the backup can be verified as being "clean" or "corrupted" based on the alerts that have been stored since the last backup operation. If the alerts that have been stored since the last backup operation indicate a potential corruption of the backup, then the backup may be tagged/labeled as "corrupted" or "unclean" without having to perform a scan operation on the backup. If the alerts that have been stored since the last backup operation do not indicate a potential corruption, then the backup label/tag of "clean" may be verified without having to perform a full scan of the backup. The full scan of the backup can be later performed at an appropriate time to verify the classification of the backup generated based on the mechanisms of the illustrative embodiments, i.e., to identify potential false positives or false negatives, and any discrepancies between the initial classification and the full scan classification can be used as feedback to the classification mechanisms of the illustrative embodiments to serve as additional training data for training machine learning computer models or adjusting parameters of a rules-based engines of the illustrative embodiments and/or may be otherwise output to a system administrator for further investigation.

Thus, a clean backup may be generated without having to perform scanning on the backup after the backup is generated. The illustrative embodiments are thus able to mark recent backups as "clean" more quickly than in the case of existing backup scanning mechanisms. Moreover, as a result, newer backups can be chosen for restore operations in the event of a cyber-attack or other need to restore the computing system. This reduces or prevents loss of data due to having to use older backups to restore from when a newer backup is available that is not yet marked clean by the scanner mechanisms.

As noted above, a primary aspect of the illustrative embodiments is to identify and tag each backup as "clean" or "not clean" based on near-real time analytics that run on the data and/or data access patterns of the data which is going to be later backed up. This processing of the data/data access patterns is done dynamically, or "on-the-fly," as data is being generated and accessed without the need to scan the data after the backup is generated. The subsequent backup of the data may be tagged or labeled with metadata specifying the "clean" or "not clean" status based on the results of the executed analytics on the data/access patterns where one or more classifiers may be used to classify the data/access patterns as to two or more classes of "cleanliness" of the backup based on the results generated by the analytics. In some illustrative embodiments, these results of the analytics are represented in alerts generated by the analytics monitoring the monitored computing system; the results are transmitted to the clean backup identification logic of one or more of the illustrative embodiments, and the illustrative embodiment in turn evaluates these alerts to determine if they indicate a potential compromise of the monitored computing system. If the alerts indicate a potential compromise, then the backup is labeled/tagged to be "not clean" or "compromised," and if the alerts do not indicate compromise, then the backup is labeled/tagged as "clean." This process may be initialized and repeated between each subsequent backup operation. This results in more recent backups marked as "clean" more quickly than compared to existing scanning methods and reduces the potential for data loss in case of a cyber-attack.

In some illustrative embodiments, the analytics are executed on the file-system based on the file access patterns such as reads, writes, deletes, renames, move-from, move-to, etc. In some illustrative embodiments, the access patterns that are analyzed are database operations, such as reading/writing rows, columns, updating keys, etc. In some illustrative embodiments, the analytics may generate results and transmit alerts that facilitate the classification and generation of tags/labels (metadata) that specify for each backup one of multiple possible classifications beyond the binary tagging/labeling of the portions of data as "clean" or "not clean," e.g., classifications of "no-risk," "low-risk," "medium-risk," "high-risk," and "critical," or the like may be generated for the backup based on the analytics results/alerts.

In one illustrative embodiment, the near real-time analytics execute on a monitored computing system to identify and tag each backup as "clean" or "not clean." The near real-time analytics run periodically according to a predefined time interval setting, e.g., every 30 seconds, on the monitored computing system, such as a virtual machine (VM), a bare-metal machine, or the like, and analyze the behavior of data accesses. Based on the analysis results, the analytics may send an alert to the clean backup identification engine of the illustrative embodiment with a set of metrics containing information that indicates if any access pattern observed in the last set of n intervals represents suspicious activity and/or a potential cyber-attack, e.g., malware, ransomware, or the like. This may be done for any number of intervals. An interval may represent a number of previous backups, a period of time, or the like. The interval can be set to any reasonable arbitrary time period so as to reduce system resources consumed. It may also be determined that if an alert is triggered following a backup, all subsequent backups are compromised until the data is restored from a clean backup.

A simple case may be n=1, where the determination as to whether an analyzed behavior of access is indicative of a cyber-attack is made on the previous interval alone, e.g., accesses occurring between the previous backup operation and the current backup operation. The value of n may be set to any desirable value for the particular implementation. For example, n=2 would indicate the determination being based on the previous 2 intervals, as in, the data access patterns occurring between the current backup operation and the backup operation occurring 2 time intervals ago. In some illustrative embodiments, the time interval may be set to other settings not tied to specific backup operations and may be a particular temporal value, e.g., a number of seconds, minutes, hours, days, etc.

In one illustrative embodiment, such real-time information may include a file-system or an equivalent database and operation counts pertaining to reads, writes, deletes, renames, move-from, move-to, etc. In another illustrative embodiment, such information might include distributions of these operations mentioned above across various intervals, temporal periods, or the like that are being monitored. In still other illustrative embodiments, such information may also include statistical scores computed individually or across metrics specified in the alerts, e.g., statistical scores based on the counts of operations noted above. In yet other illustrative embodiments, such information may include actual file names, directory names, etc. with highest statistical deviations, indicating potential compromise of the data. In some illustrative embodiments, similar statistical scores can be computed for database operations, e.g., reading/writing rows, updating keys, etc.

Once the information is sent to the clean backup identification (CBI) engine of the illustrative embodiments, the CBI engine correlates these alerts with the backups being generated. In a simple case, if there are no alerts received since the last backup was generated, then that backup may be labeled as "clean." A certain number of alerts, i.e., an alert threshold, received since the last backup may lead to a backup being labeled as "not clean" or "corrupted." In other illustrative embodiments, the CBI engine can have various levels of alert thresholds to categorize the backups being generated as clean (no-risk), low-risk, medium-risk, high-risk or critical, for example. Based on these different classifications, at a later time if the system administrator needs to restore the computing system due to a cyber-attack or any other reason, the labels/tags associated with these backups may be provided to the system administrator along with other information about the backup, e.g., date/time of the backup, size of the backup, etc., in a graphical user interface such that the system administrator can choose the backup they wish to use for restoration based on these backup labels/tags and other criteria.

In addition to labeling/tagging the backups with such labels/tags, the CBI engine can also output, such as via one or more portions of a graphical user interface, a list of corrupted files, regions of corruption, etc. Determining which files were corrupted comes from analyzing the data accesses. Not all file systems provide file region information. The labels/tags and files/file region information are gathered and sent to a CBI server via encrypted network messages. Given a complete and precise list of corrupted files, it is possible to "surgically" restore only the affected files from the clean backup. If that level of file-granularity restore is not possible, the entire affected system (e.g., virtual machine) can be restored.

All of this data may be stored in a separate database associated with the CBI engine for further forensic analysis, such as performing the full scan of the backup to verify the initial classification of the backup by the CBI engine. Thus, if a cyber-attack occurs on the system, the CBI engine can offer quick ways to identify clean (or low-risk) backups that can then be used to restore the computing systems for operational continuity, while forensic analysis is being done on other compromised (not-clean, high-risk) backups. The results of the forensic analysis may be fed back into the CBI engine to update the training and/or operational parameters of the logic of the CBI engine so as to reduce any errors in the generation of the initial backup classification, e.g., as feedback for machine learning training of machine learning computer models, as feedback for modifying operational parameters specified in rules of a rules based engine, or the like.

Before continuing the discussion of the various aspects of the illustrative embodiments and the improved computer operations performed by the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on hardware to thereby configure the hardware to implement the specialized functionality of the present invention which the hardware would not otherwise be able to perform, software instructions stored on a medium such that the instructions are readily executable by hardware to thereby specifically configure the hardware to perform the recited functionality and specific computer operations described herein, a procedure or method for executing the functions, or a combination of any of the above.

The present description and claims may make use of the terms "a," "at least one of," and "one or more of" with regard to particular features and elements of the illustrative embodiments. It should be appreciated that these terms and phrases are intended to state that there is at least one of the particular feature or element present in the particular illustrative embodiment and that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular technological implementation for accomplishing and/or performing the actions, steps, processes, etc. attributable to and/or performed by the engine. Rather, it is limited in that the "engine" is implemented in computer technology and its actions, steps, processes, etc. are not performed as mental processes or performed through manual effort, even if the engine may work in conjunction with manual input or may provide output intended for manual or mental consumption. The engine is implemented as one or more of software executing on hardware, dedicated hardware, and/or firmware, or any combination thereof that is specifically configured to perform the specified functions. The hardware may include, but is not limited to, use of a processor in combination with appropriate software loaded or stored in a machine readable memory and executed by the processor to thereby specifically configure the processor for a specialized purpose that comprises one or more of the functions of one or more embodiments of the present invention. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples are intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Various aspects of the present disclosure are described by narrative text, flowcharts, block diagrams of computer systems, and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one or more storage media (also called "mediums") collectively included in a set of one or more storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium as used in the present disclosure is not to be construed as storage in the form of transitory signals per se such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation, or garbage collection, but this does not render the storage device as transitory because the data is not transitory while it is stored.

It should be appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

The present invention may be a specifically configured computing system, configured with hardware and/or software that is itself specifically configured to implement the particular mechanisms and functionality described herein, a method implemented by the specifically configured computing system, and/or a computer program product comprising software logic that is loaded into a computing system to specifically configure the computing system to implement the mechanisms and functionality described herein. Whether recited as a system, method, or computer program product, it should be appreciated that the illustrative embodiments described herein are specifically directed to an improved computing tool and the methodology implemented by this improved computing tool. In particular, the improved computing tool of the illustrative embodiments specifically provides mechanisms for analyzing access patterns for data to classify the accesses as to whether they represent a likely cyber-attack and generate a corresponding alert, as well as mechanisms for evaluating the alerts to determine whether a subsequent backup of the computing system is "clean" or "corrupted." The improved computing tool implements mechanism and functionality, such as a clean backup identification (CBI) engine and corresponding deployed monitoring agents, which cannot be practically performed by human beings either outside of, or with the assistance of, a technical environment, such as a mental process or the like. The improved computing tool provides a practical application of the methodology at least in that the improved computing tool is able to more quickly identify backups as to whether they are "clean" or "corrupted" so that more recently generated backups may be used to restore computing systems to a "clean" state should a cyber-attack be detected.

FIG. 1 is an example diagram of a distributed data processing system environment in which aspects of the illustrative embodiments may be implemented and at least some of the computer code involved in performing the inventive methods may be executed. That is, computing environment 100 contains an example of an environment for the execution of at least some of the computer code involved in performing the inventive methods, such as clean backup identification (CBI) engine 200. In addition to CBI engine 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and CBI engine 200, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer, or any other form of computer or mobile device now known or to be developed in the future that is capable of running a program, accessing a network, or querying a database, such as remote database 130. As is well understood in the art of computer technology, and depending upon the technology, performance of a computer-implemented method may be distributed among multiple computers and/or between multiple locations. In this presentation of computing environment 100, detailed discussion is focused on a single computer, specifically computer 101, to keep the presentation as simple as possible. Computer 101 may be located in a cloud even though it is not shown in a cloud in FIG. 1. However, computer 101 is not required to be in a cloud except to any extent as may be affirmatively indicated.

Processor set 110 includes one or more computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some or all of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions and associated data are accessed by processor set 110 to control and direct performance of the inventive methods. In computing environment 100, at least some of the instructions for performing the inventive methods may be stored in CBI engine 200 in persistent storage 113.

Communication fabric 111 is the signal conduction paths that allow the various components of computer 101 to communicate with each other. Typically, this fabric is made of switches and electrically conductive paths such as the switches and electrically conductive paths that make up busses, bridges, physical input/output ports, and the like. Other types of signal communication paths may be used such as fiber optic communication paths and/or wireless communication paths.

Volatile memory 112 is any type of volatile memory now known or to be developed in the future. Examples include dynamic type random access memory (RAM) or static type RAM. Typically, volatile memory is characterized by random access, but this is not required unless affirmatively indicated. In computer 101, volatile memory 112 is located in a single package and is internal to computer 101, but, alternatively or additionally, volatile memory 112 may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data, and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in CBI engine 200 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth® connections, Near-Field Communication (NFC) connections, connections made by cables (such as universal serial bus (USB) type cables), insertion type connections (for example, secure digital (SD) card), connections made through local area communication networks, and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data now known or to be developed in the future. In some embodiments, the WAN may be replaced and/or supplemented by local area networks (LANs) designed to communicate data between devices located in a local area such as a Wi-Fi network. The WAN and/or LANs typically include computer hardware such as copper transmission cables, optical transmission fibers, wireless transmission, routers, firewalls, switches, gateway computers, and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device such as thin client, heavy client, mainframe computer, desktop computer, and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts either as images or after instantiation of the VCE. Cloud orchestration module 141 manages the transfer and storage of images, deploys new instantiations of VCEs, and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances called containers. These isolated user-space instances typically behave as real computers from the point of view of programs running in them. A computer program running on an ordinary operating system can utilize all resources of that computer such as connected devices, files and folders, network shares, CPU power, and quantifiable hardware capabilities. However, programs running inside a container can only use the contents of the container and devices assigned to the container; this feature is known as containerization.

Private cloud 106 is similar to public cloud 105 except that the computing resources are only available for use by a single enterprise. While private cloud 106 is depicted as being in communication with WAN 102, in other embodiments, a private cloud may be disconnected from the internet entirely and only accessible through a local/private network. A hybrid cloud is a composition of multiple clouds of different types (for example, private, community, or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

As shown in FIG. 1, one or more of the computing devices, e.g., computer 101 or remote server 104, may be specifically configured to implement a CBI engine 200. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as computer 101 or remote server 104, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result that facilitates restoration of a computing system to a "clean" state in response to detecting a cyber-attack or any other situation that causes the computing system to become corrupted, and from which a restoration is required, specifically by providing mechanisms to identify quickly which backups are "clean" and which are "corrupted" so that more recent backups may be used for the restoration. This minimizes data loss relative to existing scanning based backup systems which have to use older backups that have been verified as "clean" by scanning mechanisms.

Figure 2:
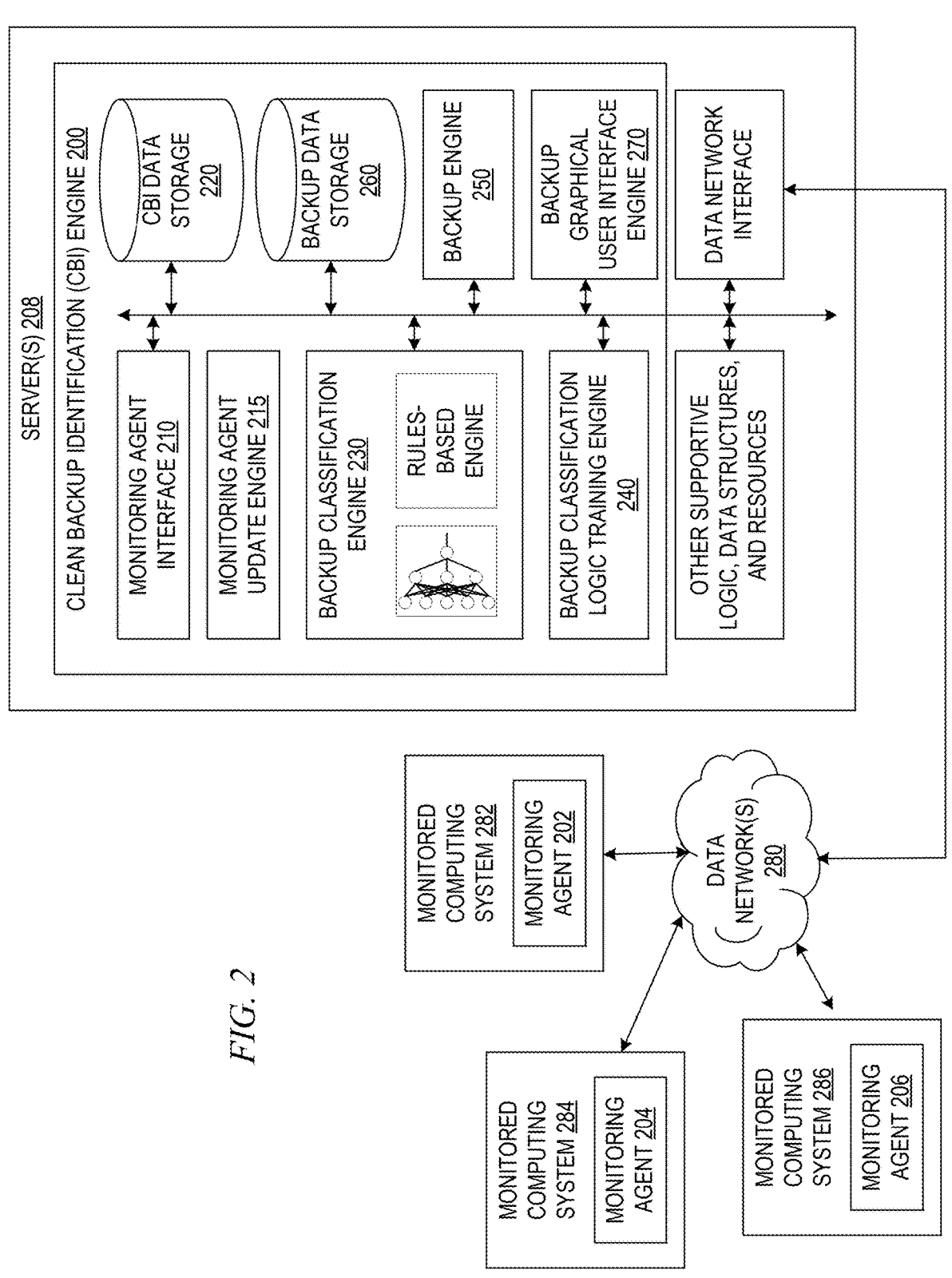
FIG. 2 is an example block diagram illustrating the primary operational components of a clean backup identification (CBI) engine and corresponding monitoring agents in accordance with one illustrative embodiment.

FIG. 2 is an example block diagram illustrating the primary operational components of a clean backup identification (CBI) engine and corresponding monitoring agents in accordance with one illustrative embodiment. The operational components shown in FIG. 2 may be implemented as dedicated computer hardware components, computer software executing on computer hardware which is then configured to perform the specific computer operations attributed to that component, or any combination of dedicated computer hardware and computer software configured computer hardware. It should be appreciated that these operational components perform the attributed operations automatically, without human intervention, even though inputs may be provided by human beings, e.g., requests to restore a system from backup, requests to view backup status and "clean" state, etc., and the resulting output may aid human beings, e.g., graphical user interfaces depicting the backup status for various backups over time. The invention is specifically directed to automatically operating computer components directed to improving the way that backups are verified as to their "clean" or "corrupted" state and providing a specific solution that implements near real-time analytics execution at the monitored system, alert generation and storage, and backup labeling/tagging based on the stored alerts, which cannot be practically performed by human beings as a mental process and is not directed to organizing any human activity.

As shown in FIG. 2, the clean backup identification (CBI) engine 200 may be implemented using one or more remote computing devices, such as server 208, communicating with one or more monitored computing systems 282-286, each of which has one or more monitoring agents 202-206 deployed and executing on the monitored computing systems 282-286. That is, an organization may register with the remotely located CBI engine 200 to gain access to the CBI engine 200 functionality. In response to registering with the CBI engine 200, a monitoring agent 202-206 is deployed to the computing systems of the organization that the organization wishes to have monitored, i.e., the monitored computing systems 282-286. The CBI engine 200 may have logic, such as monitoring agent update engine 215, which maintains the monitoring agents 202-206 with regard to the most current analytics to execute and applicable data access patterns to which the monitoring agents 202-206 match data access patterns occurring in the monitored computing systems 282-286.

The monitoring agents 202-206 perform operations to execute analytics on data accesses performed by the corresponding monitored computing system 282-286 with regard to patterns of data accesses that are indicative of a potential cyber-attack. While cyber-attacks are used herein as an example, it should be appreciated that the illustrative embodiments may be implemented for any patterns of data accesses that are indicative of data accesses that may render a backup "corrupted," e.g., patterns of data accesses indicating the data is exfiltrated from the system and then deleted on the system would indicate that new backups would not contain this data and thus, this type of pattern may be identified as potentially resulting in a corrupted backup.

Example analytics operations that can be performed by the monitoring agents 202-206 will be described in greater detail hereafter with regard to an example tiered storage system in the discussion of FIGS. 4 and 5. It should be appreciated that while the illustrative embodiments may be primarily concerned with patterns of data access representing potential cyber-attacks, the mechanisms of the illustrative embodiments may perform analytics to identify matches to patterns or signatures of data accesses that are indicative of other conditions that may render a backup as being "corrupted" or "not-clean" which may not necessarily be due to cyber-attacks, e.g., hardware failures or other sources of data corruption.

Each monitoring agent 202-206 may monitor the data accesses of their corresponding monitored computing system 282-286 by logging the data accesses and periodically, e.g., every X seconds, such as every 30 seconds, execute light-weight, near real-time analytics on the logged data accesses to determine if there is a pattern representative of a cyber-attack. If a pattern exists that is representative of a cyber-attack, the monitoring agents 202-206 generate and transmit an alert to the remotely located CBI engine 200 via one or more data networks 280. The alerts specify the matched pattern, the data (e.g., files) that were involved in the data access pattern, the region of storage or memory involved, and other characteristics of the matched data pattern. This process may be repeated continuously until stopped by some other operation or condition of the monitored computing system. That is, the monitoring agents 202-206 may operate only to monitor data accesses and alert the CBI engine 200 when patterns of data accesses match potential cyber-attacks. The other operations of the illustrative embodiments for actually tagging/labeling backups from such monitored computing systems 282-286 are performed at the remotely located CBI engine 200.

As shown in FIG. 2, the CBI engine 200 comprises a plurality of primary operational components to facilitate the tagging/labeling of backups of monitored computing system 282-286 state with regard to whether the backups are clean/not-clean. It should be appreciated that other logic, data, hardware, and computing resources, which are not specifically depicted in FIG. 2, may also be present to provide support for the depicted operational components. The depicted operational components are shown to facilitate an understanding of the operation of the CBI engine 200 but are not intended to depict the only operational components of such a CBI engine 200. It should also be appreciated that while the depiction shows the monitoring agents 202-206 being deployed to the monitored computing systems 282-286, the illustrative embodiments are not limited to such embodiments and other embodiments may be implemented in which the monitoring agents 202-206 are integrated as logic into the CBI engine 200 which monitors the monitored computing systems 282-286 remotely. Various modifications of the distribution of operational components of the illustrative embodiments may be made without departing from the spirit and scope of the present invention.

As shown in FIG. 2, in some illustrative embodiments, the CBI engine 200 comprises a monitoring agent interface 210, a monitoring agent update engine 215, a CBI data storage system 220, a backup classification engine 230, a backup classification logic training engine 240, a backup engine 250, backup data storage 260, and a backup graphical user interface (GUI) engine 270. The CBI engine 200 may operate as a cloud computing service, for example, which provides a service to client computing devices, such as monitored computing systems 282-286. As touched upon above, the monitoring agent interface 210 provides a data communication functionality for interfacing with the monitoring agents 202-206 deployed on monitored computing systems 282-286 and, thus, both sends data and commands to the monitoring agents 202-206 and receives data from the monitoring agents 202-206 such as alerts and the like. The monitoring agent update engine 215 performs the necessary operations for distributing updates to the monitoring agents 202-206 with regard to updates to analytics to execute and updates to data access patterns and signatures representative of potential cyber-attacks. The other operational components operate to store the alerts, backup data, and the like, and classify the backups as to their "clean" or "corrupted" status based on the alerts received from the monitored computing systems 282-286.

As discussed above, the illustrative embodiments determine "clean" backups without having to perform a scanning of the entire backup after the backup is generated. Instead, the CBI engine 200 relies on near-real time analytics executed on the monitored computing systems 282-286 by the monitoring agents 202-206, i.e., computer programs executing on the monitored computing systems 282-286, on a periodic basis to identify data access patterns that are indicative of a potential cyber-attack. This allows the illustrative embodiments to perform analytics on the data accesses at substantially the time the data is being generated and accessed, and allows for the generation of alerts that are sent to the remotely located CBI engine 200, which can then store and use these alerts as a basis for tagging/labeling a subsequent backup as to whether they are "clean" or "not clean" (corrupted).

In some illustrative embodiments, the analytics executed by the monitoring agents 202-206 may execute on the file-system based on the file access patterns, such as reads, writes, deletes, renames, move-from, move-to, etc. In some illustrative embodiments, the access patterns that are analyzed are database operations, such as reading/writing rows, columns, updating keys, etc. In some illustrative embodiments, both types of analytics may be employed, as well as other analytics that assist in identifying patterns of accesses to data, files, or other computing resources that may be indicative of a cyber-attack. Any suitable analytics or combination of analytics for identifying such patterns may be used without departing from the spirit and scope of the present invention.

In some illustrative embodiments, when the CBI engine 200 receives an alert from a monitoring agent, e.g., monitoring agent 202 executing on monitored computing system 282, the alert is stored in a corresponding portion of the CBI data storage system 220, e.g., a log data structure, in association with an identifier of the monitored computing system 282 and/or monitoring agent 202 from which the alert was received. In this way, the alerts and their contents may be logged for later analysis by the backup classification engine 230 and classification of a subsequent backup. That is, the alerts may be logged in the CBI data storage system 220 for a predetermined period of time which may correspond to one or more backup operations of the monitored computing system 282. For example, the CBI data storage system 220 may store logs of alerts over a specified logging interval, e.g., a period of time corresponding to a predetermined maximum number of backups that the backup classification engine 230 may evaluate when determining if a current backup is a "clean" or "corrupted" backup. This may be specified in terms of a time period, a number of backup operations, or the like. Corresponding timers and counters may be utilized by the CBI data storage system 220 to determine if and when to invalidate logs or overwrite logs for the various monitored computing systems 280. It should be appreciated that this logging interval may be different for different instances of the monitored computing systems 282-286.

As an example, the following description will assume a logging interval is specified in terms of a number of backup operations n, which may be set to any suitable integer value based on the particular implementation, e.g., n=1, n=2, and so on. For simplicity, the following description will select n=1 as a non-limiting example. In such an example embodiment, the logging of alerts is performed only with regard to alerts generated since a last backup operation occurred. Thus, between backups, the monitoring agent 202 executing on the monitored computing system 282 executes light weight near real-time analytics on a periodic basis to analyze access patterns and evaluate whether those access patterns trigger an alert. The alerts are sent to the CBI engine 200 which logs the alerts in the CBI data storage system 220 until a next backup operation occurs, i.e., a "current" backup operation which is the subject of tagging/labeling as to its "clean" or "corrupted" status by the CBI engine 200.

The logging continues until a next backup operation is initiated on the monitored computing system 282. The CBI engine 200 serves as a backup service and data storage and, thus, a backup of the state, data structures, and the like of the monitored computing system 282 may be initiated in accordance with a predetermined schedule maintained by the backup engine 250 for the monitored computing system 282. That is, the organization associated with the monitored computing system 282, when registering for the services of the CBI engine 200, may specify the periodicity of the backups that the organization wishes to perform with regard to the monitored computing system 282, e.g., hourly, daily, weekly, etc. The backup engine 250 may trigger the backup operations in accordance with this schedule by interfacing with the monitoring agent 202 to initiate the backup from the monitored computing system. The backup data structures generated by the backup operation executed on the monitored computing system 282 by the backup engine 250 are sent to the CBI engine 200 and stored in the backup data storage 260 in association with an identifier of the monitored computing system 282. The backup data storage 260 may store multiple backup data structures (also referred to herein simply as "backups") for the same monitored computing system 282 and which may be generated at various different times. It should be appreciated that while the backup engine 250 and backup data storage 260 are shown as part of the CBI engine 200, in other illustrative embodiments, these may be separate from the CBI engine 200 and may communicate with the CBI engine 200 for purposes of tagging/labeling the backups as to their "cleanliness."

In response to the initiation of the backup operation by the backup engine 250, the CBI engine 200 tags/labels the backup as to its "clean" or "corrupted" state based on the logged alerts for the monitored computing system 282. This may be done prior to completion of the backup operation and is not reliant on any scanning of the backup after the backup is generated. To the contrary, the "clean" or "corrupted" tag/label assigned to the backup and stored in metadata associated with the backup is dependent on an analysis of the logged alerts and not the content of the backup itself.

That is, the CBI engine 200 executes the backup classification engine 230 on the logged alerts to determine whether the backup is classified as "clean" or "corrupted."

The backup classification engine 230 may comprise one or more machine learning computer models, one or more rules-based engines, or the like, which may be trained by the backup classification logic training engine 240 to evaluate the alerts. In some illustrative embodiments, the contents of the alerts, e.g., which files are part of the detected patterns, which portions of memory or storage are part of the detected patterns, which patterns were matched, how many of each type of pattern were matched, and the like, may be used to generate a corresponding classification for the current backup based on the alerts.

With regard to a machine learning computer model, the backup classification logic training engine 240 may train the machine learning computer model through a machine learning process involving labeled training data corresponding to alerts and whether a corresponding backup is "clean" or "corrupted" using a machine learning algorithm, e.g., a regression algorithm or the like, to minimize an error generated between the results of the machine learning computer model and the ground truth labels of the training data. With regard to a rules-based engine, the parameters of the various rules (e.g., weights and the like associated with the rules and/or variables within the rules) may be modified to reduce errors in the results generated by the rules-based engine relative to the ground truth of a training dataset.

The backup classification engine 230 classifies the current backup based on the logged alerts in the CBI data storage system 220 for the monitored computing system 282. In the example embodiment, this may be based on the logged alerts that have been stored since the last backup operation with the backup classification engine 230 determining if the particular logged alerts indicate a potential corruption of the current backup. If so, then the backup classification engine 230 may tag/label the current backup as "corrupted" or "unclean" without having to perform a scan operation on the backup. If the alerts that have been logged since the last backup operation do not indicate a potential corruption, then the backup classification engine 230 may label/tag the current backup as "clean," again without having to perform a full scan of the backup. The tag/label may be stored as metadata associated with the backup in the backup data storage 260.

In some illustrative embodiments, the analytics executed by the monitoring agents 202-206 may generate results and transmit alerts that facilitate the classification and generation of tags/labels (metadata) that specify for each backup, one of multiple possible classifications beyond the binary tagging/labeling of the portions of data as "clean" or "corrupted." That is, various levels of "cleanliness" may be specified based on the various patterns of data access matched by the analytics. For example, the backup classification engine 230 may be configured to generate probabilities of risk based on the logged alerts and/or their contents with various ranges of probabilities being associated with different classifications of risk. For example, the backup classification engine 230 may classify a current backup based on logged alerts as to whether the backup is of "no-risk," "low-risk," "medium-risk," "high-risk," and "critical," or the like. For example, a "no-risk" backup indicates that no corruption is found in any file accesses. A "low-risk" backup indicates that there may be a discovery of malicious accesses of files, but no data corruption. A "medium-risk" backup may comprise various probabilities of files being maliciously accessed as computed by an agent analyzing the file access metadata or indeterminate data corruption. A "high-risk" or "critical" backup may be one in which there is a positive detection of corruption found in a plurality of files of the backup.

As noted above, the backup classification engine 230 operates based on the logged alerts and generates a cleanliness tag/label for the backup without having to perform a full scan of the backup after the backup is generated, which, again, may take many hours to complete. As a result, the backup is quickly identified as clean or not clean and is more readily available for use in restoration operations as opposed to other mechanisms that require a full scan of the backup before it can be verified as clean or unclean, possibly leading to data loss.

Thus, for example, if a cyber-attack is detected at the monitored computing system 282, or if some other condition arises which requires the restoration of a previous state of the monitored computing system 282 from a previously generated backup, a system administrator or other authorized person associated with the organization may log into the CBI engine 200 and request a listing of backups for the monitored computing system 282 so as to initiate a restoration of the monitored computing system 282 based on a previous backup. The backup GUI engine 270 may operate to retrieve the backups for the monitored computing system 282 from the backup data storage 260 and may display one or more GUIs showing the characteristics of the backups; each backup may include the cleanliness tag/label associated with the backup as generated by the backup classification engine 230. As this tagging/labeling is done quickly, sometimes even before the backup operation is complete, backups are virtually instantaneously verified as clean or corrupted when the backup is generated and can be virtually immediately available for use in restoration operations since this tagging/labeling is not dependent on full scans of the backup contents.

It should be appreciated that while the backup classification engine 230 operates on the logged alerts and is not dependent on a full scan of the backup contents, the full scan of the backup can be later performed at an appropriate time to perform a type of forensic analysis which verifies the classification of the backup generated by the backup classification engine 230. That is, a full scan of the backups stored in the backup data storage 260 may be performed by a scanning mechanism (not shown) after the backup is stored in the backup data storage 260 and after the backup has been tagged/labeled by the backup classification engine 230. This full scan may serve as an additional verification and can be used to identify potential false positives or false negatives generated by the backup classification engine 230. Any discrepancies between the initial classification generated by the backup classification engine 230 and the full scan classification can be used as feedback to the backup classification logic training engine 240 to serve as additional training data for training machine learning computer models or adjusting parameters of a rules-based engine of the backup classification engine 230. That is, the full scan labeling/tagging may serve as a ground truth label for the corresponding logged alerts and may be used as part of a retraining operation performed by the backup classification logic training engine 240 on the computer model(s) or rules-based engine so as to modify their previously trained operational parameters to update them and reduce or minimize errors.

Thus, with the illustrative embodiments, in the event that a restoration of a monitored computing system 282 is needed, a most recent clean backup may be identified and selected for the restoration operation where the most recent clean backup will be closer in time to the current time of the restoration operation than in prior systems that rely on scanning of backups after the backup is generated. This reduces or prevents loss of data resulting from having to use older backups to restore from when a newer backup is available but not yet marked clean by the scanner mechanisms of the prior systems.

As noted above, the illustrative embodiments provide mechanisms to tag/label backups based on the alerts generated by the monitoring agents 202-206 executing on the monitored computing systems 282-286. Based on these classifications, the backup GUI engine 270 may generate one or more GUIs presenting information about the various backups for the various monitored computing systems 282-286, which includes this cleanliness tag/label metadata, so that it may be used by a system administrator or other authorized personnel when determining which backup to use to perform a restoration operation on a monitored computing system 282-286.

FIG. 3 is an example diagram of a graphical user interface for informing authorized personnel of the "clean" or "corrupted" status of backups and providing graphical user interface elements for initiating a restoration of a computing system state based on a "clean" backup in accordance with one illustrative embodiment. As shown in FIG. 3, the GUI 300 includes a listing of backups 310 in which each row is an entry for a different backup that was previously generated for a monitored computing system. As shown in FIG. 3, the listing includes various columns of information for each of the backup including the name of the backup, the timestamp at which the backup was generated, its cleanliness tag/label, whether the backup is air-gapped, and a replication status. Of particular note, the column "Infected?" 320 represents a corresponding cleanliness tag/label metadata associated with the corresponding backup which is generated by the CBI engine 200 as described previously. This listing may be organized in a temporal sequence so that the more recent backups may be more easily identified. Thus, via this GUI 300, a system administrator or other authorized personnel can quickly identify which backups are most recent and which are clean and protected (air-gapped) from cyber threats. The replication column 322 of the listing 310 may include user selectable elements for initiating the replication based on the clean backups; the replication is a redundant copy of a backup being available. In addition, the restore column 324 of the listing 310 may include user selectable elements for initiating the restore operation from a clean backup.

In addition, the GUI 300 may include a listing 330 of the backups that have not been subjected to a full scan, i.e., forensic analysis. This listing 330 may include rows corresponding to each of the backups that have not been subjected to a full scan and columns specifying various characteristics of these backups including name, timestamp, and estimated scan time for the full scan of the backup. In addition, an action column 340 may be provided with a user selectable element for initiating the full scan of the corresponding backup.

Of particular note, the listing 310 includes many backups that have occurred, some of which are clean and some of which are not clean. The most recent backup in the depicted example occurred on May 3 at 6:36 am and is tagged/labeled by the CBI engine 200 as "clean" and, thus, can be used to perform a restore operation. Moreover, this backup is also listed as being an unscanned backup in the listing 330 with an estimate of 6 hours for completion of the scan of the backup. Thus, if one is to wait for the scan to complete, and a need for restoration occurs within 6 hours of May 3, 6:36 am, then this backup would not be designated "clean" and could not be used to restore the monitored computing system

282. To the contrary, the most recent backup designated "clean" would instead be the backup from May 2, 9:32 am. Thus, over a day of data changes may be lost by having to restore from this older backup. However, with the mechanisms of the illustrative embodiments, the backup from May 3, 6:36 am is almost immediately identified as "clean" by the CBI engine 200 based on the analysis of alerts logged between the backup of May 2, 9:32 am and the backup of May 3, 6:36 am and, thus, the most current backup of May 3 may be used to restore the monitored computing system 282. This results in data changes that may have occurred recently being able to be included in the restoration operation and, thus, there is less likelihood of data loss.

As discussed above, the illustrative embodiments operate on alerts generated by monitoring agents based on analytics executing on a monitored computing system. To further illustrate an example of analytics that may be used to trigger the generation of an alert, the following figures will present an example of a tiered storage system upon which such monitoring agents and analytics may operate. While the illustrative embodiments may operate on such a tiered storage system, the illustrative embodiments are not limited to such and may operate with any monitored computing system whether having a tiered storage or other infrastructure or configuration. To the contrary, the example of FIGS. 4-5 are presented only as examples of possible illustrative embodiments of the present invention, but the invention is not limited to these specific analytics or monitoring operations on monitored computing systems and many modifications may be made without departing from the spirit and scope of the present invention.

Figure 4:
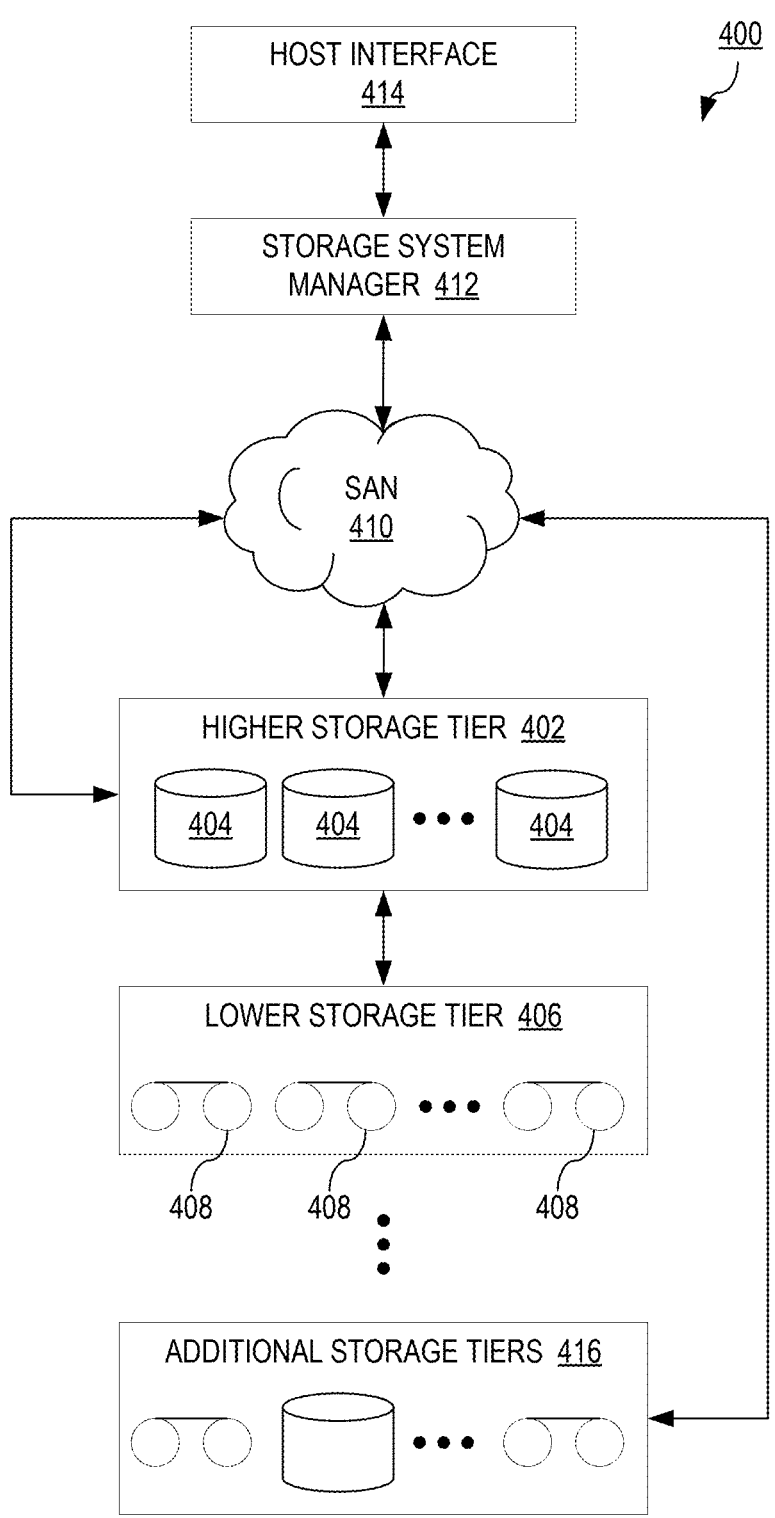
FIG. 4 is a diagram of a tiered data storage system, in accordance with one embodiment of the present invention.

FIG. 4 is a diagram of a tiered data storage system, in accordance with one embodiment of the present invention. As shown in FIG. 4, a storage system 400 is shown according to one embodiment. Note that some of the elements shown in FIG. 4 may be implemented as hardware and/or software, according to various embodiments. The storage system 400 may include a storage system manager 412 for communicating with a plurality of media and/or drives on at least one higher storage tier 402 and at least one lower storage tier 406. The higher storage tier(s) 402 preferably may include one or more random access and/or direct access media 404 such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 406 may preferably include one or more lower performing storage media 408 including sequential access media such as magnetic tape in tape drives and/or optical media, slower accessing HDDs, slower accessing SSDs, etc., and/or others noted herein or known in the art. One or more additional storage tiers 416 may include any combination of storage memory media as desired by a designer of the system 400. Also, any of the higher storage tiers 402 and/or the lower storage tiers 406 may include some combination of storage devices and/or storage media.

The storage system manager 412 may communicate with the drives and/or storage media 404, 408 on the higher storage tier(s) 402 and lower storage tier(s) 406 through a network 410, such as a storage area network (SAN) as shown in FIG. 4 or some other suitable network type. The storage system manager 412 may also communicate with one or more host systems (not shown) through a host interface 414, which may or may not be a part of the storage system manager 412. The storage system manager 412 and/or any other component of the storage system 400 may be implemented in hardware and/or software and may make use of a processor (not shown) for executing commands of a type known in the art such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 400 may include any number of data storage tiers, and may include the same or different storage memory media within each storage tier. For example, each data storage tier may include the same type of storage memory media, such as HDDs, SSDs, sequential access media (tape in tape drives, optical disc in optical disc drives, etc.), direct access media (CD-ROM, DVD-ROM, etc.), or any combination of media storage types. In one such configuration, a higher storage tier 402, may include a majority of SSD storage media for storing data in a higher performing storage environment; remaining storage tiers, including lower storage tier 406 and additional storage tiers 416, may include any combination of SSDs, HDDs, tape drives, etc., for storing data in a lower performing storage environment. In this way, more frequently accessed data, data having a higher priority, data needing to be accessed more quickly, etc., may be stored to the higher storage tier 402 while data not having one of these attributes may be stored to the additional storage tiers 416, including lower storage tier 406. Of course, one of skill in the art, upon reading the present description, may devise many other combinations of storage media types to implement into different storage schemes according to the embodiments presented herein.

According to some embodiments, the storage system (such as 400) may include logic configured to receive a request to open a data set, logic configured to determine if the requested data set is stored to a lower storage tier 406 of a tiered data storage system 400 in multiple associated portions, logic configured to move each associated portion of the requested data set to a higher storage tier 402 of the tiered data storage system 400, and logic configured to assemble the requested data set on the higher storage tier 402 of the tiered data storage system 400 from the associated portions. Of course, this logic may be implemented as a method on any device and/or system or as a computer program product according to various embodiments of the present disclosure.

As noted above, ransomware is an increasingly prevalent form of malware which encrypts victims' files for extorting a ransom to be paid within a short time frame or risk losing the files. Zero-day vulnerability is computer software vulnerability that is unknown and/or unaddressed by the target. Hackers may exploit zero-day vulnerability to adversely affect computer programs, data, additional computers, a network, etc. A zero-day attack is a hacker exploit directed at zero-day vulnerability and "day zero" typically refers to the day on which the target learns of the vulnerability.

Conventional solutions to detect ransomware attacks run on individual Windows® desktops and laptops that use kernel modules or network sniffers to capture and analyze file system traffic. Solutions which are implemented directly onto the client side may be considered intrusive and include taking snapshot copies of data flowing over a network for analysis following extraction. Conventional solutions extend the functionality of the kernel to perform changes in the kernel nodes of the clients. However, the foregoing solutions do not scale to distributed file system deployments comprising a client and server architecture. Scalability may refer to location transparency, client caching ability, the efficiency of bulk data transfers, etc., in at least some approaches.

Known ransomware detectors which use audit logs to analyze file system activity do not monitor file system activity in sufficient detail and are prohibitively expensive for practical operation where the detectors rely on "audited" to generate audit events in more detail than otherwise customary. For large, distributed file system deployments, there remains a need for a lightweight solution which runs on servers and/or clients to detect and correct possible corruption due to ransomware. More preferably, a lightweight solution for distributed file system deployments does not include significant changes to client systems. A lightweight solution preferably includes a solution with relatively low resource consumption.

Various illustrative embodiments of the present invention may include monitoring agent mechanisms that limit damage to files by providing ransomware detection and recovery based on analyzing file access patterns, using file system facilities, such as audit logs, filter drivers (e.g., Windows®), stacked file systems (e.g., Unix®), and/or lightweight events. Access is preferably monitored at two levels of detail in various approaches described herein. Access is monitored at a high level for ransomware detection, including information about individual read and write operations (e.g., offset, length, entropy, etc.). Access is monitored at a low level for recovery (e.g., enough information is monitored to enable tracking of files being updated and/or deleted).

In some approaches, periodic, high detail samples of file system activity are taken and analyzed to detect ransomware and a low detail access log is used to identify the files that might have been corrupted and/or files to be restored from backup and/or snapshots. Monitoring the files may be performed at two levels of detail including a high level of detail and a low level of detail. Monitoring at a high level of detail includes monitoring information associated with individual read and/or write operations (e.g., from each node). In a preferred embodiment, the high level of monitoring is associated with detection of malware activity to be described in detail below. Monitoring at a low level of detail includes tracking files which are updated and/or deleted by a process. In another preferred embodiment, the low level of monitoring is used to identify the at least one file to be restored to be described in detail below. A process may refer to a process associated with malware activity in at least some embodiments.

At least some of the illustrative embodiments of the present invention may be used in conjunction with threat detection and response systems that help security teams outsmart threats including ELK, Splunk®, systems made to unify the security analyst experience and accelerate their speed across the full incident lifecycle, etc., for protecting against known malware signatures. Methods based on analyzing network traffic may be complementary to at least some of the approaches described herein.

Figure 5:
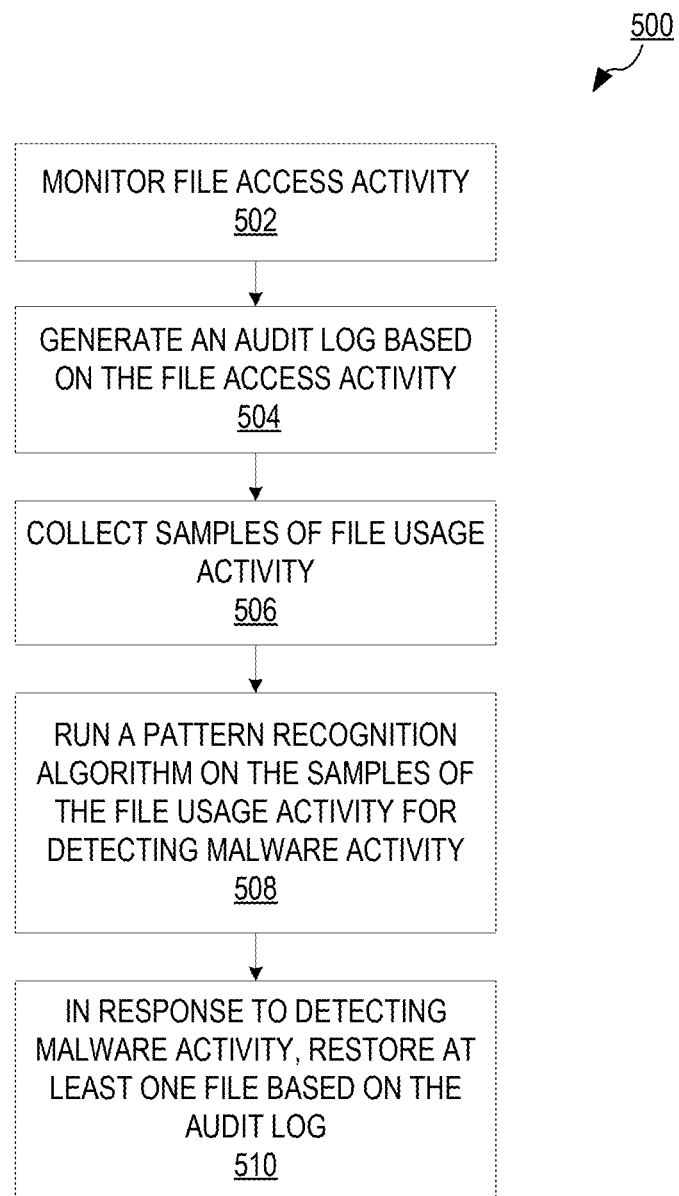
FIG. 5 is a flowchart outlining an operation for monitoring data access activity in accordance with one illustrative embodiment.
Figure 6:
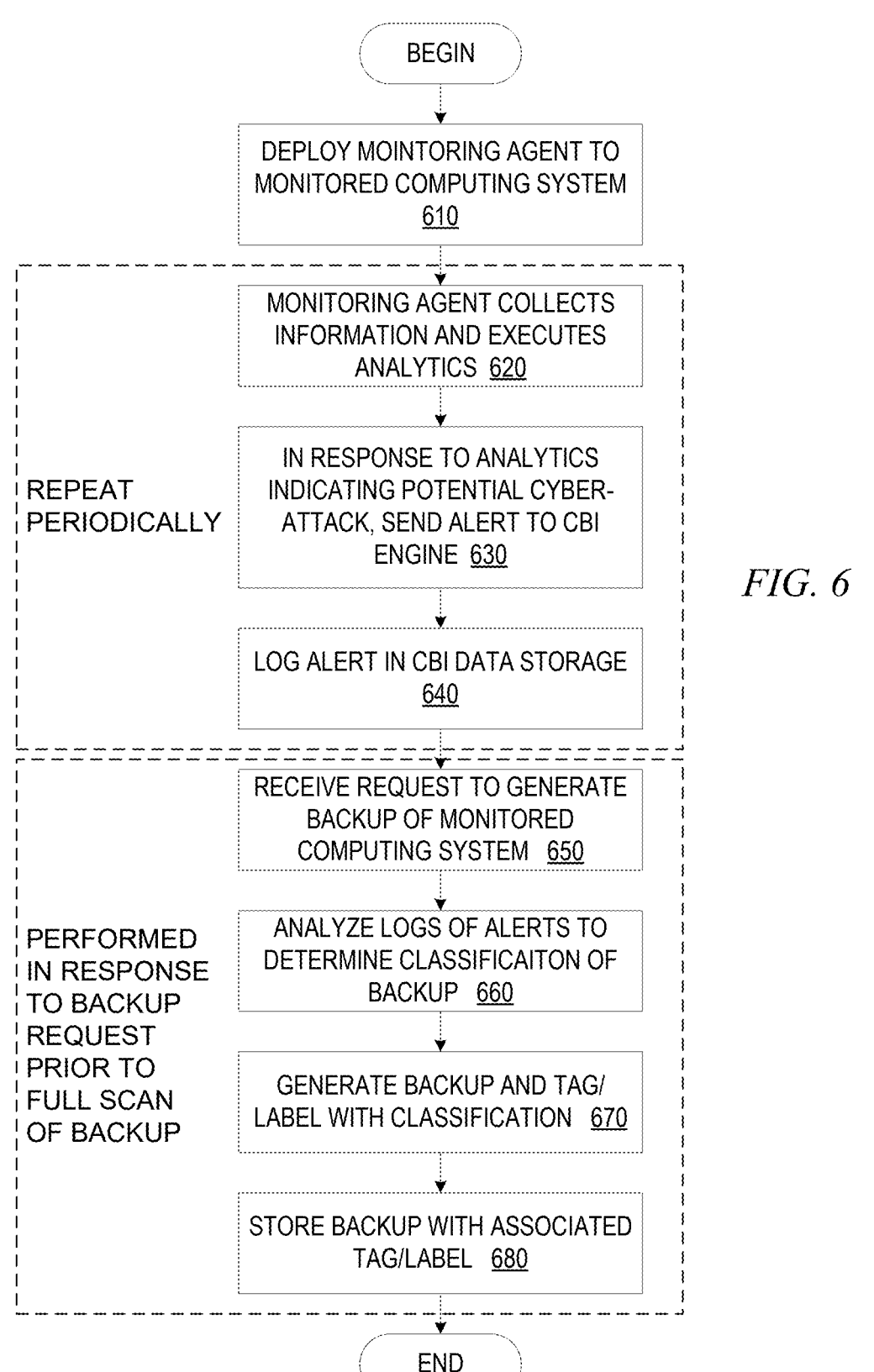
FIG. 6 is a flowchart outlining an example operation for labeling/tagging a backup as to its "clean" or "corrupted" state in accordance with one illustrative embodiment.

Now referring to FIG. 5, this figure depicts a flowchart outlining an operation for monitoring data access activity in accordance with one illustrative embodiment. FIGS. 5-6 present flowcharts outlining example operations of elements of the present invention with regard to one or more illustrative embodiments. It should be appreciated that the operations outlined in FIGS. 5-6 are specifically performed automatically by an improved computer tool of the illustrative embodiments and are not intended to be, and cannot practically be, performed by human beings either as mental processes or by organizing human activity. To the contrary, while human beings may, in some cases, initiate the performance of the operations set forth in FIGS. 5-6, and may, in some cases, make use of the results generated as a consequence of the operations set forth in FIGS. 5-6, the operations in FIGS. 5-6 themselves are specifically performed by the improved computing tool in an automated manner.

As shown in FIG. 5, the method 500 may be performed in accordance with the present invention in any of the environments depicted in FIGS. 1-4, among others, in various embodiments. Of course, more or fewer operations than those specifically described in FIG. 5 may be included in method 500 as would be understood by one of skill in the art upon reading the present descriptions.

Each of the steps of the method 500 may be performed by any suitable component of the operating environment. For example, in various illustrative embodiments, the method 500 may be partially or entirely performed by computers or some other device having one or more processors therein. The processor, e.g., processing circuit(s), chip(s), and/or module(s) implemented in hardware and/or software, and preferably having at least one hardware component, may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 5, method 500 includes operation 502 which comprises monitoring file access activity. In one preferred approach, file audit logging is used to monitor file access activity and/or generate an audit log (see operation 504 below) based on the file access activity; file audit logging may be available, for example, in a cluster file system that provides concurrent access to a single file system or set of file systems from multiple nodes. File access activity may include any file updates, deletions, snapshots, backup events, etc., from each node. File access activity may be serialized by a stream processing engine. In some approaches, file access activity may also include malfunctioning activity.

Operation 504 includes generating an audit log based on the file access activity. In preferred approaches, the audit log is used to revert and/or restore at least one file to a last known "good" or "clean" copy of the file. Reverting at least one file may refer to reverting the at least one file to the last full copy of the file. Restoring at least one file may refer to restoring the at least one file to the last copy of the file in a backup.

Generating the audit log preferably includes capturing file operations on a file system and logs the operations to a retention enabled file set. The audit logs may capture snapshots events and/or backup events. The foregoing events may enable recovery (e.g., reversion and/or restoration) of a corrupted file to the most recent uncorrupted version of the file. In some illustrative embodiments, the audit log is stored in a database for enabling system auditing.

Operation 506 includes collecting samples of file usage activity. In one approach, operation 506 occurs on each node of a distributed file system. Each node locally processes live events collected in a relatively short period of time in a memory buffer in the node. The relatively short period of time may be set by a user, a client, a server, a manufacturer, a default setting, etc. The live events may be collected periodically, randomly, substantially constantly, in response to a trigger event, etc., as determined by a user, a client, a server, a manufacturer, a default setting, etc. The collecting of detailed live events is scalable to the distributed file system and increasing number of nodes. In one preferred approach, clustered watch folders (e.g., file operations watched across one or more clusters that are watched via a centralized tool) may collect the samples of file usage activity.

In preferred approaches, application(s) are not blocked during collection of the samples of file usage activity and/or analysis thereof. The live events may be collected in memory and any analysis is performed after collection thereof. In some illustrative embodiments, the node from which live events are collected may perform any analysis to be described in detail below or the analysis may be performed by a monitoring agent deployed to such a node or a monitoring node of the monitored computing system. The analysis may be run on a plurality of nodes to balance the overall load on the nodes that the analysis puts on the cluster.

In various approaches, data collected from file events for each Process ID (PID) may include file table entry structure information such as: file path, file name, extension containing fields (per file values), etc. Each PID may represent and/or uniquely identify an active process. The data per PID may include current status (e.g., open, read, write, closed, deleted), newly_created (e.g., yes=open during current time window, no=otherwise), newly_open (e.g., yes=open during current time window, no=otherwise), bytes_read (e.g., cumulated, from read events on the file), bytes_written (e.g., cumulated, from write events), file_size (e.g., at open or just before unlink/delete), min_read_offset, max_read_offset (e.g.,//max_read_offset includes read_len), min_write_off-set, max_write_offset (e.g.,//max_write_offset includes write_len), read_entropy, write_entropy (e.g., averaged high and low.fwdarw.low), etc. Values may be computed across files in each PID table including total_nbr_deleted_files, total_nbr_overwritten_files (e.g.,//computed in second scan), per_PID_bytes_read, per_PID_bytes_written, per_PID_perc_files_written (e.g.,//computed in second scan as the percentage of files accessed for write from all file accesses (for either read or write) by the process PID), etc.

In some illustrative embodiments, each active process in a distributed file system may be associated with an individual PID. In some approaches, each machine in a distributed file system may be associated with an individual PID. In other approaches, each node in a distributed file system may be associated with an individual PID. In some illustrative embodiments, the file access activity and the file usage activity are associated with files stored in a distributed file system.

Operation 508 includes running a pattern recognition algorithm on the samples of the file usage activity for detecting malware activity. Malware activity may include ransomware activity, for example. Malware activity may be interchangeably referred to as a "suspected process." In some illustrative embodiments, running the pattern recognition algorithm comprises analyzing elements associated with the file usage activity including read/write offsets, associated lengths, real time entropy calculations, etc. In various illustrative embodiments, running the pattern recognition algorithm comprises feeding the audit log into an artificial intelligence (AI) model trained by machine learning according to various illustrative embodiments described in detail below.

A pattern recognition algorithm may be implemented for detecting behavioral ransomware in file systems. In one approach, the pattern recognition algorithm may detect attack patterns on files (e.g., based on the file usage activity, etc.). One attack pattern includes "file overwriting" where a full file or a partial file is overwritten with relatively higher entropy. The relatively higher entropy is indicative of encrypted and/or compressed data. Another attack pattern includes "file replacing" where file content is read, encrypted, and copied to a newly created file. The newly created file has a similar (but mangled) name and/or size to the original file and the original file is deleted (e.g., unlinked). These are only examples of patterns that may be identified by the pattern recognition algorithm and the pattern recognition algorithm may operate to identify other types of patterns in addition to or in replacement of these example patterns.

In one approach, elements associated with the file usage activity which are used to enable detection include GPFS policy event rules, user PID, file name, file size, minimum read offset, maximum read offset, minimum write offset, maximum write offset, sample read entropy, sample write entropy, etc., or any combination thereof. The foregoing elements are aggregated on a CLOSE event in some approaches. The file access, monitoring, and/or detection preferably runs periodically for relatively short windows (e.g., about 10 seconds to about 100 seconds).

In one illustrative embodiment, in response to a pattern recognition algorithm detecting malware activity, a detailed analysis, by one or more analytics executed by a monitoring agent or the like, of the files modified by the suspected process is performed. For example, a detailed analysis may include reading various parts of the modified files, computing entropy, etc. In various approaches, the detailed analysis may be allocated to a different node from the node from which the modified files are stored. The different node may be allocated the detailed analysis for load balance where any node in a distributed file system can access any file.

In some embodiments, a detection algorithm may be used for each PID and/or client. The initial values of the detection algorithm may evolve differently for each PID based on user (e.g., a client, a manufacturer, a third party, etc.) feedback. For example, the initial values of the detection algorithm may include values specifying whether a client mode is enabled or not, a time window size to collect event data (e.g., 10 seconds), a maximum number of deleted files (e.g., 10 to 20 files), a minimum percentage of files read/written (e.g., 40% of files either read or written), or the like.

In one illustrative embodiment configuration, file events may be monitored for k seconds (e.g., time window). The file system event policies may be set to issue relevant events (e.g., read, write, create, open, close, delete) with file paths and process ID and output events to a small buffer which hold one to a few events (e.g., enough buffer to parse the events and/or extract content from the events). The file system events for each PID may be monitored for the maximum k seconds. A PID file table may be created for data collected from file events. For example, for each new file name encountered in file system events, a new file entry may be created in the specified PID file table and the new file entry may be initialized. A file path may be shared by files in the same directory to take less space. The file entries may be updated in PID file tables with values found in successive events.

Operation 510 includes, in response to detecting malware activity, restoring at least one file based on the audit log. In preferred embodiments, the audit log captures snapshots and backup events. Snapshots and backup events may be used for precise recovery of the at least one file by providing the most recent uncorrupted version of a file. At least some of the offsets collected may be used to identify the area of the file that was accessed and/or corrupted. In some approaches, the audit log is used to match the detected PID which corresponds to the malware activity. In one example, in response to a rw_nodeID_PID process being detected by a node, a search of a database for files modified and/or deleted by rw_nodeID_PID indicates what files to restore from the latest snapshot or backup.

In various approaches, monitoring file access activity and/or collecting samples of file usage activity may be performed by a monitoring agent, which may be implemented as a detection daemon. The monitoring agent, or detection daemon, may perform the various operations either directly on the client side or on the file server side. Performing operations directly on the client may be performed on a cluster file system (e.g., a general parallel file system) node without the client. The exact malware process may be detected at fine granularity where the detection daemon is run on the client side (e.g., where the applications are run). In some illustrative embodiments, performing operations on the file server side includes using a storage networking protocol. The client machine infected by the ransomware may be detected where the monitoring agent or detection daemon is run on the file server side. Access of the infected client machine to the file system may be disabled.

File access patterns detection may be based on machine learning in various embodiments. Samples may be collected from systems running workloads with or without malware activity. The samples may be used as training data for a machine learning model (e.g., supervised learning). In response to detecting malware activity, feedback from the user may be used to train the model in at least one embodiment.

Various elements associated with the file usage activity, which may be used by the pattern recognition algorithm for detecting malware activity, include events (e.g., OPEN, CLOSE, CREATE, UNLINK, DESTROY, RENAME, etc.), common attributes on every event (e.g., fsName, nodeName, processID, inode, pathName, fileSize, timeStamp, etc.), CLOSE events additional attributes (e.g., minimum read offsets, maximum read offsets, minimum write offsets, maximum write offsets, bytes read, bytes written, max read entropy, min write entropy, etc.), etc. Various default thresholds may be associated with each of the elements for detecting malware activity. Malware activity may be based a predefined change in at least one of the elements and/or any combination thereof.

File access patterns detection may be based on machine learning in various illustrative embodiments. Samples may be collected from systems running workloads with or without malware activity. The samples may be used as training data for machine learning model (e.g., supervised learning). In response to detecting malware activity, feedback from the user may be used to train the model in at least one illustrative embodiment.

The malware detection techniques may include a 'file' command being used to determine the types of files in which malware activity is detected. However, such techniques may be problematic where, if the header is not encrypted but the rest of the file is, the malware activity is not detected in the file. In contrast, various illustrative embodiments of the present invention may detect partially encrypted files using features such as the maximum and/or minimum read/write offsets for both overwritten files with encrypted content, replaced files, and/or newly created files. Conventional malware techniques do not include operations for detection of partially encrypted files and the replacement of deleted files as disclosed herein.

FIG. 6 is a flowchart outlining an example operation for labeling/tagging a backup as to its "clean" or "corrupted"

state in accordance with one illustrative embodiment. As shown in FIG. 6, the operation starts by registering a monitored computing system for monitoring; this includes deploying a configured monitoring agent to the monitored computing system (step 610). The monitoring agent collects information from the monitored computing system and executes analytics; executing analytics may include machine learning-based pattern recognition to identify potential cyber-attacks on the monitored computing system (step 620). In response to a pattern being matched, alerts are generated and sent to the CBI engine (step 630) which logs the alerts (step 640).

At a later time, a request may be received at the CBI engine to generate a backup of the monitored computing system state (step 650). The CBI engine analyzes the logs of alerts to determine a classification of the backup based on the logged alerts (step 660). The backup is generated and tagged/labeled in metadata associated with the backup based on the classification of the backup from the analysis of the logged alerts (step 670). For example, if a predetermined number of alerts or characteristics of the alerts indicate a likelihood that the monitored computing system is the target of a cyber-attack, then the backup may be labeled as "corrupted" or "not-clean." If the number and/or characteristics of the alerts indicate that there is not a likelihood that the monitored computing system was the target of a cyber-attack, then the backup may be labeled as "clean." The labeled/tagged backup may then be stored in a backup storage for later access to restore the monitored computing system to a prior clean state (step 680) and/or for later full scan as part of a verification or forensic operation. The operation then terminates.

Although FIG. 6 shows the operation terminating after storage of the backup, it should be appreciated that the operation may be repeated for each backup request. That is, the operations 620-640 may be repeated for periodically within a given period n. If n is 1, then the operations 620-640 are repeatedly performed, e.g., every x number of seconds, between each backup operation. In response to a backup operation request, the operations 650-680 are performed. Moreover, following an operation according to FIG. 6, in response to a request to access information about stored backups, a graphical user interface, such as shown in FIG. 3 for example, may be generated based on the stored backups and their associated tags/labels as to their "cleanliness." This may facilitate restoration operations using such tagged/labeled backups as discussed above.

The flowchart and block diagrams in the figures described above illustrate the architecture, functionality, and operation of possible implementations of systems, methods, and computer program products according to various illustrative embodiments of the present invention. In this regard, each block in the flowchart or block diagrams may represent a module, segment, or portion of instructions which comprises one or more executable instructions for implementing the specified logical function(s). In some alternative implementations, the functions noted in the blocks may occur out of the order noted in the figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic such as an application specific integrated circuit (ASIC), a FPGA, etc. By executable by the processor, what is meant is that the logic is hardware logic; software logic such as firmware, part of an operating system, part of an application program, etc., or some combination of hardware and software logic that is accessible by the processor and configured to cause the processor to perform some functionality upon execution by the processor. Software logic may be stored on local and/or remote memory of any memory type as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above. It will be further appreciated that embodiments of the present invention may be provided in the form of a service deployed on behalf of a customer to offer service on demand.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable those of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, in a data processing system, for identifying clean backups of a monitored computing system, the computer-implemented method comprising:

monitoring access operations of the monitored computing system to detect patterns of access operations indicative of a cyber-attack on the monitored computing system, wherein the access operations are monitored in near real-time as the access operations are executed by the monitored computing system;

generating logged alert data dynamically based on the monitoring indicating a match of the monitored access operations to the patterns of access operations indicative of the cyber-attack;

generating a backup of a state of the monitored computing system; and based on the generating of the backup:

accessing a data storage to retrieve the logged alert data associated with the monitored computing system;

executing, by a classification engine, a classification operation on the logged alert data to determine whether the logged alert data of the data storage indicates that the state of the monitored computing system was a target of the cyber-attack within a predetermined period of time prior to a time the backup was generated;

in a case where the classification operation indicates that the monitored computing system was the target of the cyber-attack, generating a first tag for the backup indicating the backup to be corrupted;

in a case where the classification operation indicates that the monitored computing system was not the target of the cyber-attack, generating a second tag for the backup indicating the backup to be clean; and storing one of the first tag or the second tag in association with the backup to thereby indicate the backup to be either corrupted or clean.

2. The computer-implemented method of claim 1, wherein the backup is indicated to be either corrupted or clean without performing a scan of the backup.

3. The computer-implemented method of claim 1, further comprising:

executing a full scan of the backup based on signatures, patterns, or fingerprints of known cyber-attacks; and based on the full scan of the backup indicating a different result from results of the classification operation, providing feedback data regarding the different result to the classification engine for further training of the classification engine.

4. The computer-implemented method of claim 1, wherein the monitoring of the access operations and the generating of the logged alert data are performed between backups of the state of the monitored computing system, and the backups of the state include the backup.

5. The computer-implemented method of claim 1, wherein the monitoring of the access operations comprises collecting real-time metric information or statistical measures of real-time metric information, and wherein the real-time metric information comprises counts of at least one of read, write, delete, rename, move-from, or move-to access operations.

6. The computer-implemented method of claim 1, wherein the classification operation comprises determining whether a number of alerts within the predetermined period is equal to or greater than a threshold number of alerts.

7. The computer-implemented method of claim 1, wherein the classification engine comprises one or more machine learning computer models that are trained through a machine learning process on training data, and wherein the training data comprises training backups and training alert data to classify the training backups as to whether the training backups are clean or not clean.

8. The computer-implemented method of claim 1, further comprising:

generating a graphical user interface specifying a listing of backups of the monitored computing system, wherein the listing of backups of the monitored computing system comprises the backup, each backup in the listing of backups has a cleanliness representation specifying whether a corresponding backup in the listing of backups is clean or corrupted, and a setting of the cleanliness representation is set based on whether the first tag or the second tag is associated with the corresponding backup.

9. The computer-implemented method of claim 8, wherein the graphical user interface further comprises:

for each backup in the listing of backups whose cleanliness representation indicates a clean state, a restore graphical user interface element that is user selectable to cause a restore of the monitored computing system to a previous state corresponding to the corresponding backup, and based on a user selecting the restore graphical user interface element, the monitored computing system is restored to the previous state using the corresponding backup.

10. A computer program product comprising a computer readable storage medium having a computer readable program stored therein, wherein the computer readable program, when executed on a computing device, causes the computing device to:

monitor access operations of a monitored computing system to detect patterns of access operations indicative of a cyber-attack on the monitored computing system, wherein the access operations are monitored in near real-time as the access operations are executed by the monitored computing system;

generate logged alert data dynamically based on the monitored access operations that indicate a match of the monitored access operations to the patterns of access operations indicative of the cyber-attack;

generate a backup of a state of the monitored computing system; and based on the generation of the backup:

access a data storage to retrieve the logged alert data associated with the monitored computing system;

execute, by a classification engine, a classification operation on the logged alert data to determine whether the logged alert data of the data storage indicates that the state of the monitored computing system was a target of the cyber-attack within a predetermined period of time prior to a time the backup was generated;

in a case where the classification operation indicates that the monitored computing system was the target of the cyber-attack, generate a first tag for the backup indicating the backup to be corrupted;

in a case where the classification operation indicates that the monitored computing system was not the target of the cyber-attack, generate a second tag for the backup indicating the backup to be clean; and store one of the first tag or the second tag in association with the backup to thereby indicate the backup to be either corrupted or clean.

11. The computer program product of claim 10, wherein the backup is indicated to be either corrupted or clean without performing a scan of the backup.

12. The computer program product of claim 10, wherein the computer readable program further causes the computing device to:

execute a full scan of the backup based on signatures, patterns, or fingerprints of known cyber-attacks; and based on the full scan of the backup indicating a different result from results of the classification operation, provide feedback data regarding the different result to the classification engine for further training of the classification engine.

13. The computer program product of claim 10, wherein the the access operations are monitored and the logged alert data is generated between backups of the state of the monitored computing system, and the backups of the state include the backup.

14. The computer program product of claim 10, wherein the monitor of the access operations comprises collection of real-time metric information or statistical measures of real-time metric information, and wherein the real-time metric information comprises counts of at least one of read, write, delete, rename, move-from, or move-to access operations.

15. The computer program product of claim 10, wherein the classification operation comprises determination of whether a number of alerts within the predetermined period is equal to or greater than a threshold number of alerts.

16. The computer program product of claim 10, wherein the classification engine comprises one or more machine learning computer models that are trained through a machine learning process on training data, and wherein the training data comprises training backups and training alert data to classify the training backups as to whether the training backups are clean or not clean.

17. The computer program product of claim 10, wherein the computer readable program further causes the computing device to:

generate a graphical user interface that specifying a listing of backups of the monitored computing system, wherein the listing of backups of the monitored computing system comprises the backup, each backup in the listing of backups has a cleanliness representation specifying whether a corresponding backup in the listing of backups is clean or corrupted, and a setting of the cleanliness representation is set based on whether the first tag or the second tag is associated with the corresponding backup.

18. An apparatus, comprising:

at least one processor; and at least one memory coupled to the at least one processor, wherein the at least one memory comprises instructions which, when executed by the at least one processor, cause the at least one processor to:

monitor access operations of a monitored computing system to detect patterns of access operations indicative of a cyber-attack on the monitored computing system, wherein the access operations are monitored in near real-time as the access operations are executed by the monitored computing system;

generate logged alert data dynamically based on the monitored access data that indicates a match of the monitored access operations to the patterns of access operations indicative of the cyber-attack;

generate a backup of a state of the monitored computing system; and based on the generation of the backup:

access a data storage to retrieve the logged alert data associated with the monitored computing system;

execute, by a classification engine, a classification operation on the logged alert data to determine whether the logged alert data of the data storage indicates that the state of the monitored computing system was a target of the cyber-attack within a predetermined period of time prior to a time the backup was generated;

in a case where the classification operation indicates that the monitored computing system was the target of the cyber-attack, generate a first tag for the backup indicating the backup to be corrupted;

in a case where the classification operation indicates that the monitored computing system was not the target of the cyber-attack, generate a second tag for the backup indicating the backup to be clean; and store one of the first tag or the second tag in association with the backup to thereby indicate the backup to be either corrupted or clean.

\* \* \* \* \*